United States Patent Office 3,475,341
Patented Oct. 28, 1969

3,475,341
OPTICAL WHITENING OF ORGANIC MATERIALS
Ichiro Okubo and Michihiro Tsujimoto, Tokyo, Japan, assignors to Mitsui Kagaku Kogyo Kabushiki Kaisha, (Mitsui Chemical Industry Co., Ltd.), Tokyo, Japan, a corporation of Japan
No Drawing. Filed Nov. 24, 1967, Ser. No. 685,342
Claims priority, application Japan, Dec. 3, 1966, 41/79,225
Int. Cl. C09k 1/02; C07d 55/02
U.S. Cl. 252—301.2       3 Claims

ABSTRACT OF THE DISCLOSURE

Optical whitening process for organic materials which comprises incorporating in organic material at least one of triazole derivatives of the general formula

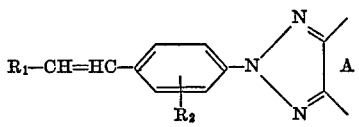

wherein A is one selected from the group consisting of acenaphthene rings and naphthalene rings containing alkoxy group, $R_1$ is one selected from the group consisting of a cyano group and substituted carbonyl groups of the formula R—CO— whose R is one selected from the groups consisting of a hydroxyl group, an alkoxy group, a substituted alkoxy group and a substituted amino group, and $R_2$ is one selected from the groups consisting of hydrogen, a methyl group and a chloride atom.

---

This invention relates to a process for optically whitening organic materials with novel triazole derivatives of the Formula I (I)
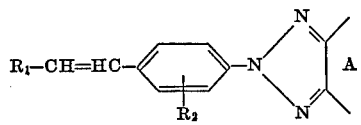

wherein A is an acenaphthene ring or a naphthalene ring containing alkoxy group, $R_1$ is a cyano group or a substituted carbonyl group (R—CO—) whose substituent R is selected from the groups consisting of a hydroxyl group, an alkoxy group, a substituted alkoxy group and a substituted amino group, and $R_2$ is hydrogen, a methyl group or a chlorine atom.

The novel triazole derivatives of the Formula I of the invention were not known at all hitherto. They are crystals which are essentially faintly yellowish to light yellow in color. They dissolve in organic solvents such as methanol, acetone or benzene and give off an intense violet fluorescence under sunlight. Since the fluorescence of the novel compounds is exceedingly great, they are very valuable as optical brightening agents and can demonstrate pronounced results in the optical whitening of organic materials, especially those organic fibrous materials which are synthetic high molecular substances. Their excellent fastness to light is also noteworthy. The organic materials to which the optical whitening process of the invention can be applied include such, for example, as the synthetic high molecular substances belonging to the polyamide, polyacrylic, polyolefinic, polystyrene and polyester types, and as to the organic fibrous materials the polyester type synthetic fibers are especially important.

The novel triazole derivatives used in the optical whitening process of the invention can be made in the following manner. A diazonium compound obtained by diazotizing in customary manner a 4-aminocinnamic acid of the Formula II (II)
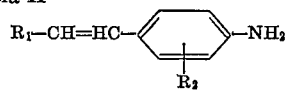

or a derivative thereof, wherein $R_1$ and $R_2$ have the same meanings as in Formula I, is coupled with an aminoacenaphthene or an aminonaphthalene containing alkoxy group of the Formula III (III)
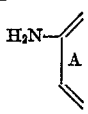

wherein A has the same meanings as in Formula I, which has been so selected as to form an o-aminoazo compound by coupling with the diazonium compound, to form an o-aminoazo compound of the Formula IV (IV)
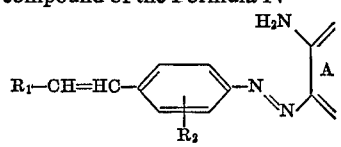

wherein $R_1$, $R_2$ and A have the same meanings as in Formula I, and thereafter the ring closure of the o-aminoazo portion of the o-aminoazo compound of Formula IV is carried out by oxidation to form the 1,2,3-triazole ring. In this case, though the final stage of triazole ring formation can be carried out in customary manner, best results can be obtained if copper acetate is used in a basic solvent such as pyridine or picoline.

The 4-aminocinnamic acid of the Formula II and its derivatives are exemplified by such compounds as follows: 4-aminocinnamic acid, methyl 4-aminocinnamate, ethyl 4-aminocinnamate, n-propyl 4-aminocinnamate, isopropyl 4-aminocinnamate, n-butyl 4-aminocinnamate, 4-aminocinnam-methylamide, 4-aminocinnam-dimethylamide, 4-aminocinnam - ethylamide, 4 - aminocinnam-(ω-diethylaminopropyl)amide, 4-aminocinnanilide, 4-aminocinnam-o-toluidide, 4-aminocinnam-m-toluidide, 4-aminocinnam-p-toluidide, methyl-2-chloro-4-aminocinnamate, methyl-2-methyl-4-aminocinnamate, β-diethylaminoethyl-4-aminocinnamate, β - methoxyethyl - 4 - aminocinnamate, β-ethoxyethyl - 4 - aminocinnamate, 4 - aminocinnamonitrile, 2 - methyl - 4 - aminocinnamonitrile and 2 - chloro-4-aminocinnamonitrile.

As the aminoacenaphthenes or aminonaphthalenes containing alkoxy group of the Formula III, included are such, for example, as the following compounds: 5-aminoacenaphthene, 4-methoxy-1-aminonaphthalene, 4-ethoxy-1-aminonaphthalene, 4-n-propoxy - 1 - aminonaphthalene and 4-isopropoxy-1-aminonaphthalene.

Of the novel triazole compounds used in the invention, those in which $R_1$ in Formula I is a substituted carbonyl group can be made by either esterifying or amidizing in customary manner the carboxylic acids or carboxylic halogenides of the Formula V.

(V)
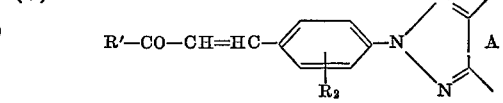

wherein $R_2$ and A have the same meanings as in Formula I and R' is a hydroxy group or a halogen atom. On the other hand, of the compounds of Formula I in which $R_1$ is a substituted carbonyl group (R—CO—), those containing as the substituent R a nitrogen atom such as can be quaternized can be made into a so-called cationized compound of Formula I by quaternizing the nitrogen atom in customary manner.

Examples of the novel triazole derivatives of Formula

I, which are used in the optical whitening process of the invention, are shown in the table, it being understood however that the compounds of the invention are not limited thereto.

| Number | Structural Formula | M.P. (° C.) |
|---|---|---|
| 1 | H₃COCOCH=HC—C₆H₄—[naphthotriazole] | 209–210.5 |
| 2 | H₃COCOCH=HC—C₆H₃(CH₃)—[naphthotriazole] | 191–193 |
| 3 | H₃COCOCH=HC—C₆H₃(Cl)—[naphthotriazole] | 220–221 |
| 4 | H₃COCOCH=HC—C₆H₄—[naphthotriazole-OCH₃] | 212.5–213.5 |
| 5 | H₃COCOCH=HC—C₆H₃(CH₃)—[naphthotriazole-OCH₃] | 202–204 |
| 6 | H₃COCOCH=HC—C₆H₃(Cl)—[naphthotriazole-OCH₃] | 222–223 |
| 7 | H₃COCOCH=HC—C₆H₄—[naphthotriazole-OC₂H₅] | 177–179 |
| 8 | H₅C₂OCOCH=HC—C₆H₄—[naphthotriazole-OCH₃] | 156–157 |
| 9 | n-H₉C₄OCOCH=HC—C₆H₄—[naphthotriazole-OCH₃] | 119–120 |

| Number | Structural Formula | M.P. (° C.) |
|---|---|---|
| 10 | H₃CHNCOCH=HC—⟨structure with OCH₃⟩ | 263–263.5 |
| 11 | (H₃C)₂NCOCH=HC—⟨structure with OCH₃⟩ | 201–202 |
| 12 | (H₃C)₂N(CH₂)₃NHCOCH=HC—⟨structure with OCH₃⟩ | 176–178 |
| 13 | [(H₃C)₃N(CH₂)₃NHCOCH=HC—⟨structure with OCH₃⟩]⊕ CH₃SO₄⊖ | 190 (d.) |
| 14 | ⟨o-tolyl⟩—NHCOCH=HC—⟨structure with OCH₃⟩ | 277.5–278 |
| 15 | (CH₃)₂N(CH₂)₂OCOCH=HC—⟨structure with OCH₃⟩ | 147–148 |
| 16 | [(H₃C)₃N(CH₂)₂OCOCH=HC—⟨structure with OCH₃⟩]⊕ CH₃SO₄⊖ | 262–264 (d.) |
| 17 | H₃CO(CH₂)₂OCOCH=HC—⟨structure with OCH₃⟩ | 124–125 |
| 18 | NC—CH=HC—⟨structure⟩ | 257–258.5 |

| Number | Structural Formula | M.P. (° C.) |
|---|---|---|
| 19 | NC—CH=HC—(C₆H₃)(H₃C)—N(triazole-naphthalene) | 244–245 |
| 20 | NC—CH=HC—(C₆H₃)(Cl)—N(triazole-naphthalene) | 275–275.5 |
| 21 | NC—CH=HC—(C₆H₄)—N(triazole-naphthalene-OCH₃) | 256.5–257.5 |
| 22 | NC—CH=HC—(C₆H₃)(H₃C)—N(triazole-naphthalene-OCH₃) | 275–275.5 |
| 23 | NC—CH=HC—(C₆H₃)(Cl)—N(triazole-naphthalene-OCH₃) | 257–258 |
| 24 | NC—CH=HC—(C₆H₄)—N(triazole-naphthalene-OC₂H₅) | 224.5–226.5 |
| 25 | HOOC—CH=HC—(C₆H₄)—N(triazole-naphthalene-OCH₃) | >300 |

According to the process of the invention, a broad range of organic materials can be whitened optically by using the novel triazole compounds of Formula I. When the organic materials are synthetic fibers, they may be treated in an aqueous medium containing the novel triazole compounds in a suspended state and, if desired, the treatment is favorably carried out by the addition of a suitable surfactant. As the surfactant to be used in this case, preferred are the anionic type surfactant such as a sodium alkylbenzene sulfonate, the condensation product of naphthalenesulfonic acid and formaldehyde, the sulfuric acid esters of higher alcohols, or the nonionic type surfactant such as a polyoxyethylene aryl ether. In the treatment of the polyester type synthetic fibers, the whitening effect can be further enhanced by the addition to the treatment bath of a so-called carrier such as either trichlorobenzene or salicyclic acid esters. In the case where the polyester type synthetic fibers are to be treated in the form of a cloth, it particularly is advantageous to adhere the new triazole compounds uniformly to the cloth from an aqueous medium containing a surfactant in accordance with the pigment padding technique. The novel triazole compounds in which the nitrogen contained in the substituent R in Formula I has been quaternized, can be used as a cationic brightening agent with the polyacrylic type snythetic fibers. In this case it is possible to use these compounds in their aqueous solution in the same bath with the chlorous acid bleaching treatment.

In carrying out the foregoing treatment of the synthetic fibers according to the process of the invention, the treatment temperature adopted is preferably one ranging between 50° and 130° C. in the case where the treatment is to be carried out in an aqueous medium, whereas a temperature ranging between 160° and 230° C. is especially effective in the case of a dry heat treatment.

The novel triazole compounds of Formula I, which are used in the process of the invention, can also be added to or blended with the organic materials prior to or during their molding and in this manner the optical whitening of these organic materials can be effected. Again, it is also possible to use these novel triazole compounds by dissolving or dispersing them in a finely divided state in a spinning solution prior to the spinning operation in spinning the organic materials into fibrous products and thus to carry out in a favorable manner the optical whitening of the spun synthetic fibers. Further, on occasions it is also possible to use these triazole compounds during the manufacturing step, for example, the polymerization or condensation step of those synthetic resinous materials which are the organic materials to which this invention applies.

When the organic materials are to be whitened optically by the process of the invention, the novel triazole compounds of Formula I are preferably used in an amount, based on the weight of the material treated, ranging between 0.01% and 1.0%, as desired.

The following nonlimitative examples are given for further illustrating the invention. Unless otherwise noted, the parts in the examples are on a weight basis.

EXAMPLE 1

16.3 parts of 4-aminocinnamic acid are dissolved by heating in 25 parts of concentrated hydrochloric acid and 100 parts of water. After cooling the solution to 0–5° C., 7 parts of sodium nitrite are added to carry out the diazotization. After eliminating the excess nitric acid in the diazo solution with sulfamic acid, the following reaction is carried out. 17.3 parts of 4-methoxy-1-naphthylamine are dissolved by heating in 30 parts of glacial acetic acid followed by pouring this solution into water to make an emulsion. The diazo solution obtained hereinbefore is then added to the latter solution at below 10° C. with thorough stirring. This is followed by the addition of sodium acetate and neutralizing the mineral acid and then stirring for several hours to complete the coupling. The resulting purple precipitate of o-aminoazo compound is separated by filtration, water-washed and compressed. The filtered mass is mixed with 200 parts of pyridine and 60 parts of copper acetate and boiled for 5 hours under reflux with stirring. The reaction solution is poured into water containing 300 parts of hydrochloric acid, the precipitate is separated by filtration, washed with water and dried to thereby obtain the crude triazole compound. This is purified by recrystallization from dimethyl sulfoxide. This has the following structural formula and demonstrates melting point above 300° C.

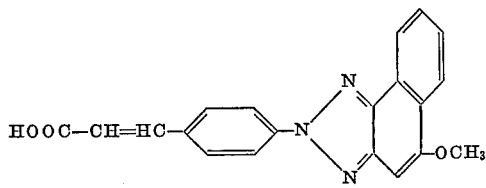

One part of the foregoing compound is boiled for 5–6 hours under reflux in 10 parts of methanol along with one part of concentrated sulfuric acid to effect its esterification. The so obtained methyl ester is recrystallized from toluene and light yellow minute acicular crystals of melting point 212–213.5° C. are obtained. This product is the compound having the structural formula shown in Example 2. The maximum absorption wavelength of its ultraviolet absorption spectrum (methanol solution) is 304 mμ and 363.5 mμ, while the maximum wavelength of its fluorescent spectrum (benzene solution) in 420 mμ.

EXAMPLE 2

One part of the novel triazole compound having the structural formula

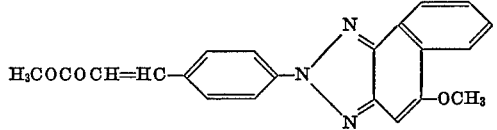

was blended thoroughly with 9 parts of an alkylbenzenesulfonic acid type surfactant to prepare a sample. 0.2 part of the so prepared sample was taken and added to 500 parts of a treatment bath containing one part of a higher alcohol sulfuric acid ester type surfactant. To a treatment bath prepared in this manner were introduced 10 parts of a fiber composed of polyterephthalic acid ethylene glycol ester (hereinafter referred to as polyester fiber), as the material to be treated, and treated for 60 minutes at 120° C. When the so treated fiber was water-washed and then dried, a pronounced whitening effect was obtained as compared with the case of that which was untreated.

EXAMPLE 3

The treatment was carried out as in Example 2 except that the compound used was one having the structural formula

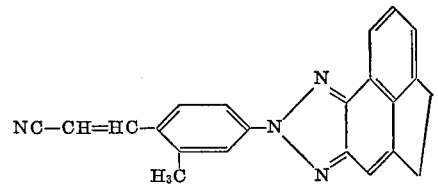

with the result that a pronounced whitening effect was obtained as compared with the case of an untreated fiber.

EXAMPLE 4

One thousand parts of a treatment bath containing 2 parts of a compound having the structural formula

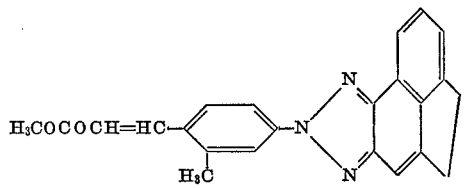

one part of a sodium alkylbenzenesulfonate type surfactant and one part of a polyoxyethylene alkyl ether type surfactant were prepared. After dipping a fabric of polyester fiber in this treatment bath, it was pigment padded at a squeeze rate of 40–50%. The so obtained treated cloth was air dried followed by dry heating for one minute at 200–210° C. When the so treated cloth was soaped, water-washed and dried, a pronounced whitening effect was obtained as compared with the case of an untreated cloth.

EXAMPLE 5

When a polyamide fiber (nylon) was treated at a treatment temperature of 80° C., as in Example 2, using a compound having the structural formula

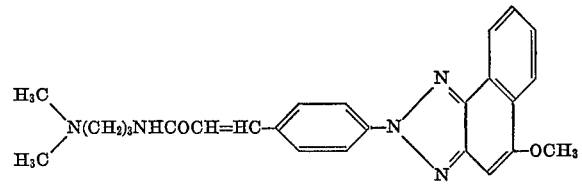

a pronounced whitening effect was obtained as compared with the case of an untreated fiber.

EXAMPLE 6

To 4000 parts of a treatment bath containing 0.1 part of a compound having the structural formula

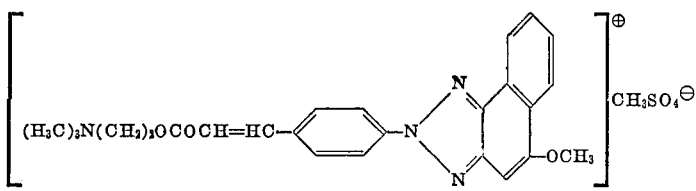

4 parts of oxalic acid and 4 parts of sodium chlorite were introduced 100 parts of a polyacrylic cloth, after which the cloth was treated therein for 40 minutes at 100° C. After a dechlorination treatment of the cloth in a hot aqueous solution containing one gram of sodium hydrogen sulfite per one liter thereof, the cloth was washed with water and dried. The whitening effect obtained was pronounced as compared with that in the case of an untreated cloth.

EXAMPLE 7

A compound having the structural formula

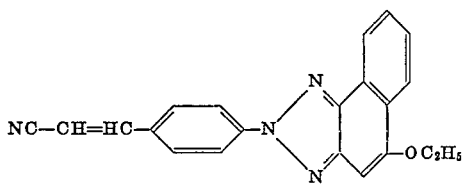

in an amount of 0.1 part was mixed homogeneously with 100 parts of polyester granules composed of polyterephthalic acid ethylene glycol ester, following which the mixture was made into a film having a thickness of about 0.05 mm. by pressing for 4 minutes between metallic plates heated at 260° C. The degree of whiteness of the so obtained film was perceivably much higher than that of a similarly prepared film in which the aforesaid compound was not used.

EXAMPLE 8

The spinning solution was prepared by melting the mixture of Example 7 at 280–290° C. and spun by extruding it from spinnerets. As a result, polyester fibers having an increased whiteness were obtained.

EXAMPLE 9

A homogeneous mixture consisting of 0.1 part of a compound having the structural formula

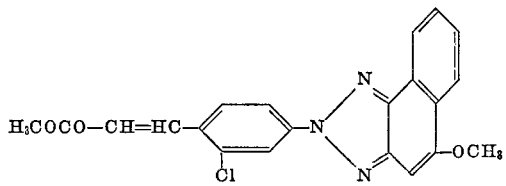

100 parts of polyvinyl chloride and 50 parts of dioctyl phthalate was kneaded for 10 minutes at 150° C. and then pressed for 5 minutes between metallic plates heated at 160° C. to form a film having a thickness of about 0.5 mm. The degree of whiteness of the so obtained film was perceivably much greater than that of a similarly prepared film in which the aforesaid compound was not used.

We claim:

1. An optical whitening process for organic high molecular weight materials which comprises incorporating in the organic material at least one triazole derivative of the general formula

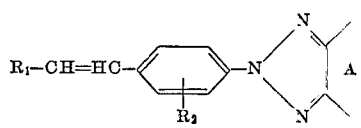

wherein A is selected from the group consisting of acenaphthene rings and naphthalene rings containing alkoxy group, $R_1$ is selected from the group consisting of a cyano group and substituted carbonyl groups of the formula R—CO— whose R is selected from the groups consisting of a hydroxyl group, an alkoxy group, a substituted alkoxy group and a substituted amino group, and $R_2$ is selected from the group consisting of hydrogen, a methyl group and a chlorine atom.

2. The method according to claim 1 wherein at least one of said triazole derivatives is contacted with the organic material in an aqueous dispersion system.

3. The method according to claim 1 wherein at least one of said triazole derivatives is admixed with the organic material at the time of melting.

References Cited

UNITED STATES PATENTS 3,218,332  11/1965  Heller et al. _____ 260—308

TOBIAS E. LEVOW, Primary Examiner

A. P. DEMERS, Assistant Examiner

U.S. Cl. X.R.

117—33.5; 260—240, 308